United States Patent [19]
Mongiello

[11] Patent Number: 5,288,414
[45] Date of Patent: Feb. 22, 1994

[54] POOL SKIMMING DEVICE

[76] Inventor: Louis Mongiello, 4 Haskel La., Smithtown, N.Y. 11787

[21] Appl. No.: 902,671

[22] Filed: Jun. 23, 1992

[51] Int. Cl.$^5$ .................. B01D 35/027; E04H 4/00
[52] U.S. Cl. .................... 210/776; 210/169; 210/416.2; 4/490
[58] Field of Search .......... 210/169, 776, 416.2; 15/1.7; 4/490

[56] References Cited

U.S. PATENT DOCUMENTS

| | | | |
|---|---|---|---|
| 3,625,364 | 12/1971 | La Chance | 210/169 |
| 3,774,767 | 11/1973 | Field | 210/169 |
| 4,068,327 | 1/1978 | Heinlein | 210/169 |
| 4,089,074 | 5/1978 | Sermons | 210/169 |
| 4,169,331 | 10/1979 | Baker | 15/1.7 |
| 4,221,662 | 9/1980 | Joseph | 210/169 |
| 4,369,109 | 1/1983 | Edge | 210/169 |
| 4,451,379 | 5/1984 | Levy | 210/169 |
| 4,455,695 | 6/1984 | Mikhel | 210/169 |
| 4,734,189 | 3/1988 | Page, Jr. | 210/169 |
| 4,836,920 | 6/1989 | Miller, Jr. | 210/169 |
| 5,173,181 | 12/1992 | McFarland | 210/169 |

OTHER PUBLICATIONS

Hayward Pool & Spa Products Catalog, p. 33, ©1991.

Primary Examiner—Peter A. Hruskoci
Assistant Examiner—Robert James Popovics
Attorney, Agent, or Firm—Nolte, Nolte and Hunter

[57] ABSTRACT

A pool skimming device is stably secured to the peripheral structure of a pool so that the hoop and net are situated in the path of the water surface current caused by the water input of a pool's circulation system.

8 Claims, 4 Drawing Sheets

FIG. I

POOL SKIMMING DEVICE

BACKGROUND OF THE INVENTION

This invention relates to a device for skimming debris off the surface of a body of water and, more particularly, for skimming debris such as dead leaves, twigs, and scum off of the surfaces of pools prior to their sinking and forming a sludge at the bottom of the pool.

The invention has particular application to above-ground pools but is adaptable to in-ground pools as well.

Skimming debris from the water surface of pools is usually done manually with a net attached to a long handle manipulated by a person attending to that job.

Where automatic skimming is attempted, the prior art generally concerns itself with barriers extending at an angle from a point in the wall of the pool between the water inlet and the skimmer outlet. A generally circular flow of water from inlet to outlet sweeps the debris into the barrier, whereupon the debris is diverted and deposited in the outlet skimmer.

Variations on the prior art solution are disclosed in Field, U.S. Pat. No. 3,774,767; Heiniein, U.S. Pat. No. 4,068,327; Joseph, U.S. Pat. No. 4,221,662; Mikhel, U.S. Pat. No. 4,455,695; and Page, U.S. Pat. No. 4,734,189.

However, in circularly shaped pools, in particular, the circular flow of water from the inlet creates a whirlpool effect and much of the debris is drawn to the center of the pool escaping the barrier.

The present invention is vastly simpler and cheaper to produce than anything in the prior art in that it mounts the usually manually manipulated skimmer pool side and disposes the net of the skimmer in the pool for automatic skimming within the flow of injected water. The invention contemplates the directing of the injected water flow and also the support of the skimmer to place it within a set flow of injected water. As will be appreciated, the determination of skimmer placement will vary with different shapes of pools and within the flow of water which may be set or directed.

In a simple preferred embodiment of the invention, a specially formed skimmer pole handle provides placement of the skimmer net below the level of the pool deck or the cope of above ground pools without a deck. Various modes of anchoring the pole pool side may be used, including a pivot attachment for vertical positioning of the pole and net and various modes of securing the net to the pole are contemplated, including a swivel connection to rotate the net to accommodate set flows of injected water.

DETAILED DESCRIPTION OF THE DRAWINGS

Figure 1:
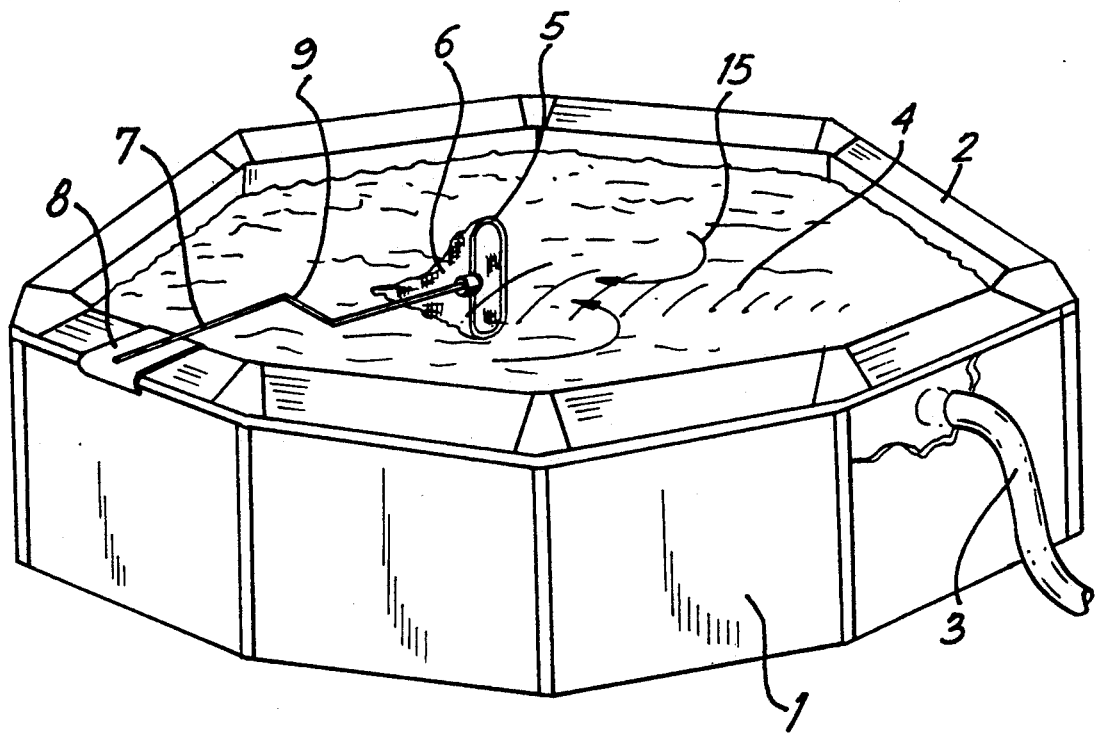
FIG. 1 is a perspective view of the invention in use.
Figure 2:
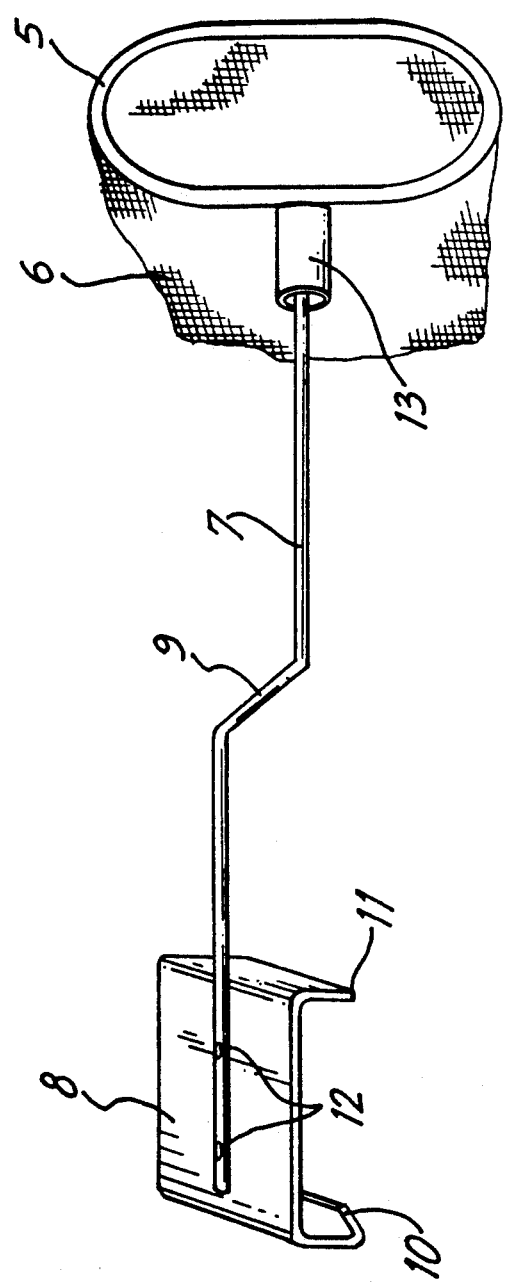
FIG. 2 is a perspective view of the skimming apparatus of the invention.

Referring to FIGS. 1 and 2, a hoop 5 is provided with a net 6 the open mouth of which is attached about the hoop's circumference. The hoop and net from commonly available hand skimmers may be used for this purpose. A support member 7 having a downward bent portion 9 for positioning the net in the water is connected at one end to the pole receptor 13 of the hoop by any suitable means and takes the place of the straight pole handle of prior art skimmers. The support member is connected at the other end to a coping bracket 8. Here, the connection is effected by bolts 12, but of course any other means are suitable. The support member is preferably made of plastic tubing for ease in fabrication.

Referring to FIG. 1, a typical outdoor above-ground circular swimming pool is shown, having a wall 1, a coping 2 about the periphery, and an input port 3 through which filtered and chlorinated water is reinjected into the pool. It is to be noted however that the invention is not limited to above-ground pools or to circular pools.

The injection of water into the pool results in an input current 4 on the water surface (here directed by the adjustment of an input nozzle S toward the center of the pool) which sets up a current pattern that draws floating debris from water surface regions outside and on either side of the input current into the input current as indicated by the arrows 15. For above-ground pools, the device is simply mounted on the coping 2 such that the hoop 5 is directly in the path of the input current 4. Debris is thereby swept into the net.

Figure 3:
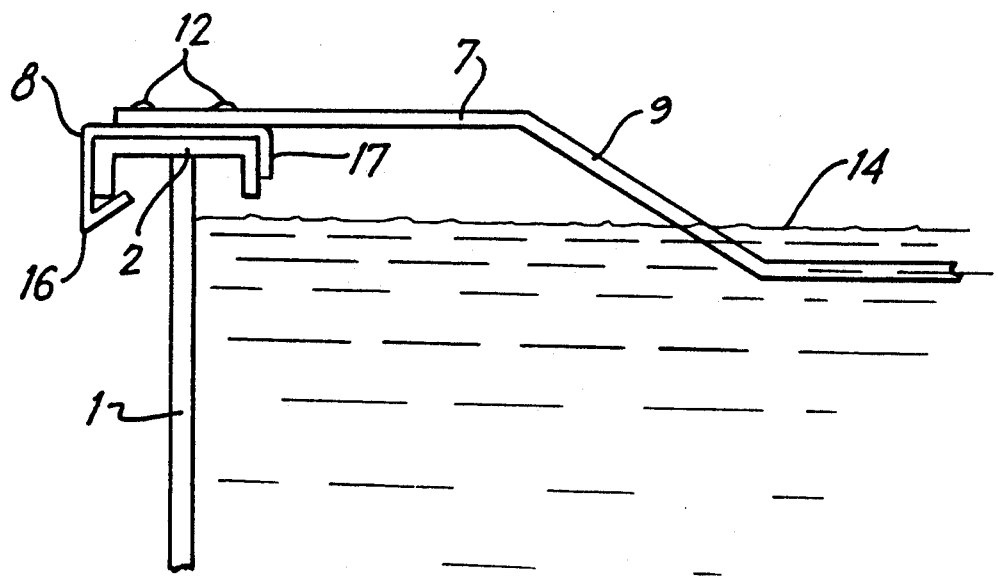
FIG. 3 is a side plan view of a coping bracket supporting the support member of the skimmer.

In FIG. 3 is seen a side view of the clamp shaped coping bracket 8. The bracket surrounds the coping 2 with a hooked portion 16 to support the weight of the hoop, and a downward depending portion 17 to firmly secure the bracket. Note that the crook or bent portion 9 in the support member 7 serves to position the hoop and net partially below the water surface 14. For a circular hoop, optimal effectiveness is achieved at about a ⅔ submersion of the hoop's diameter. With this arrangement, the skimming device, including the bracket, after use, may be readily removed for pool use.

In some pools, the injection of water through the input port can be directed within 15° to 45° from the point of injection by means of, for example, a swivel nozzle S (in FIG. 1) so that placement of the net can be accommodated.

In pools where current flow cannot be directed, the support member must be fixed in a position to accommodate the current flow.

Figure 3A:
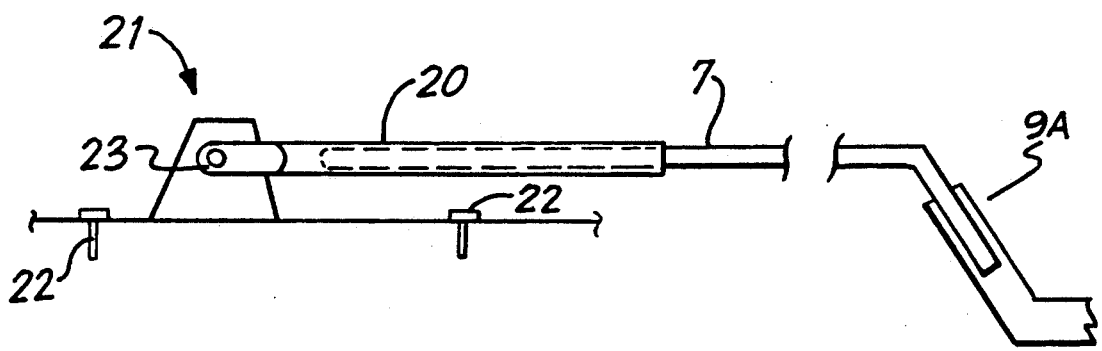
FIG. 3A is a diagrammatic side plan view of a modified construction of pool side bracket.

Similarly, the length of the bent portion in the support member between the upper and lower bends may be made variable to accommodate the distance between pool side and water surface by providing telescoping tubing between the bends, as diagrammatically shown in FIGS. 3A at 9A; or the bracket mounting the support member may be constructed to vary the vertical angle of the support member, also as shown diagrammatically in FIG. 3A.

For in-ground pools which lack a coping, any number of suitable bracket designs may be devised for mounting on concrete or wooden decks. In such instances the support member may simply be inserted in a tubular holder 20 of a mounting bracket 21, secured to pool side via bolts 22 as diagrammatically shown in FIG. 3A. The tubular holder may be pivoted as at 23 to vary the vertical placement of the hoop. In this construction, the support member may be removed from the tubular holder when the pool is in use. Also, a weighted mounting bracket (not shown) may be used which can be removed along with the support member and net.

Figure 4:
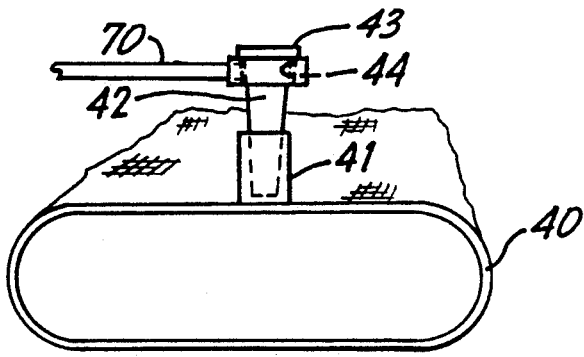
FIG. 4 is a diagramatic side plan view of a modified skimming apparatus in which the pole receptor of a standard skimmer hoop depends from of a shaft pivoted at the end of a skimmer pole.
Figure 4A:
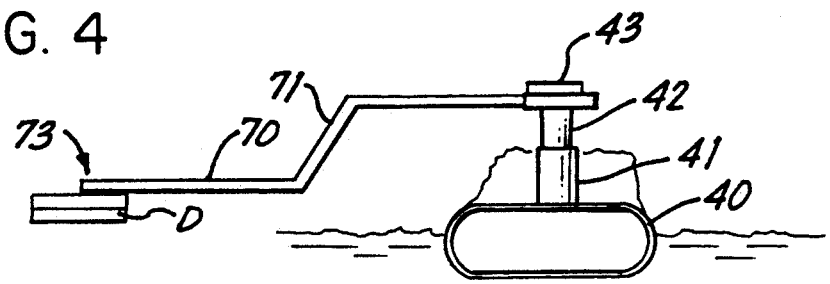
FIG. 4A is a diagrammatic side plan view of the skimming apparatus of FIG. 4 showing the skimmer pole extending from a pool side bracket.

In FIGS. 4 and 4A there is shown a modification of the structures comprising the skimmer apparatus of the invention and in which the netted hoop 40 is secured via pole receptor 41 to a shaft 42 which is flanged at its upper end 43 to support the shaft which extends through an aperture 44 at the widened end of skimmer pole 70. The shaft 42 and therefore the netted hoop, in this instance oval in shape, is pivotable about the vertical axis of the shaft for positioning the hoop in the path of the inlet current flow with about two-thirds of its open mouth area submerged.

The bent portion 71 of support or skimmer pole 70 is directed upwardly as this apparatus is proposed for pool side anchoring as at 73 in an in-ground pool where the water surface is close to the top of the pool deck. The upward bent portion 71 also accommodates the length of the downward extension of the shaft 42 from its pivot support at the end of the skimmer pole.

Figure 5:
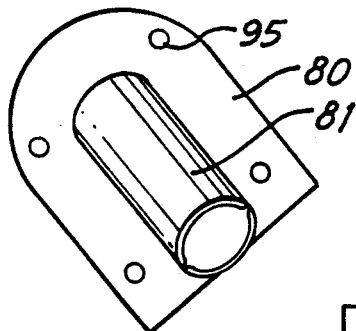
FIGS. 5 and 5A are diagrammatic plan views of a mounting bracket and the mounting end of a skimmer pole which may be used in the apparatus of the invention.
Figure 5A:
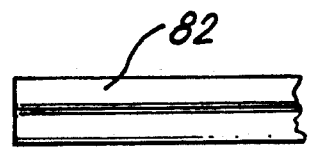
Figure 5B:
FIG. 5B is a cross section of the skimmer pole of FIG. 5A.

FIGS. 5 and 5A show a mounting plate 80 and skimmer pole receptor 81 shaped to receive a skimmer pole 82 which is generally oval in cross-section, as shown in FIG. 5B.

Figure 6:
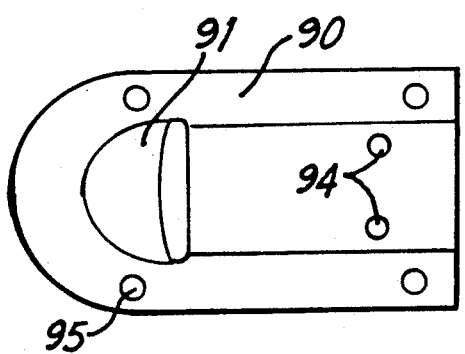
FIG. 6 and 6A are diagrammatic top and side plan views of another type of support bracket.
Figure 7:
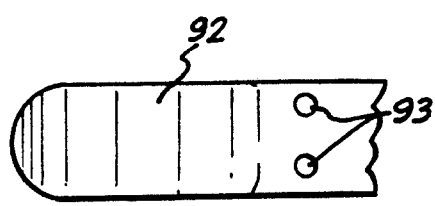
FIGS. 7 and 7A are diagrammatic top and side plan views of the mounting end of a skimmer pole fitting the support bracket of FIGS. 6 and 6A.
Figure 6A:
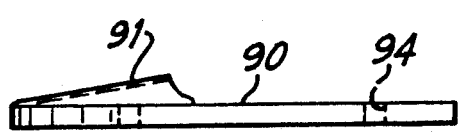
Figure 7A:
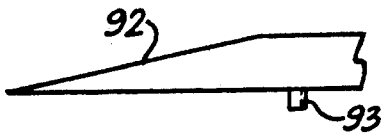

FIGS. 6 and 6A show another form of mounting plate 90 with a receptor 91 shaped to receive the diminished end (FIGS. 7 and 7A) of a skimmer pole 92, provided with drop pegs 93 which are received in peg receptors 94 in support plate 90.

The mounting plates 80 and 90 are provided with mounting holes 95 for bolts (not shown).

As can be appreciated, the positioning of the netted hoop so that approximately two-thirds of the open mouth of the neck is below the surface of the water, may be accomplished in any number of various ways; i.e. by providing a bend in the skimmer pole; a pivoted mounting of the pole to the mounting plate; or varying the length of the vertical connection of the hoop to the skimmer pole, all depending upon the type of pool to be serviced.

The invention need not be limited to the particular structures shown and described but is limited only by the following claims.

I claim:

1. A method of automatically skimming debris off the surface of a pool having a center and an input surface current, said method comprising:

directing said input surface current along a path substantially toward said pool center, a distance inwardly of the side of the pool to create a current pattern that draws floating debris from water surface regions outside and on either side of the input current into the input current;

stably mounting a collection net directly in the path of the input surface current substantially inwardly of the sides of the pool and in said current pattern, wherein floating debris carried by the current is swept into said net.

2. The combination of apparatus for securement to the peripheral structures of swimming pools having a center for skimming floating debris off the water surface of a pool with a water input nozzle which creates a water surface input current, comprising:

means mounting said input nozzle for directing said input current along a path substantially toward said pool center, a distance inwardly of the sides of the pool to create a current pattern that draws floating debris from water surface regions outside and on either side of the input current into the input current;

a hoop;

a net with an open mouth secured about the circumference of said hoop;

an elongated hoop supporting member having a distal end and a proximal end, said hoop being secured to said distal end;

means at said proximal end of said elongated support member for detachably affixing said support member to the peripheral structure of a pool;

said elongated support member; a) including means intermediate its ends for compensating for the distance between the water surface and the peripheral structures of the pool and b) extending longitudinally sufficiently intermediate its ends to constitute means for positioning said hoop partially submerged in water below the surface with said open mouth directly in and perpendicular to the path of the input current substantially inwardly of the sides of the pool and in the current pattern at a point where floating debris from either side of the input current is drawn into the input current, wherein the floating debris is swept into said net.

3. The combination of claim 2 wherein said compensating and hoop positioning means intermediate the ends of said elongated support member comprises bends in said support member to compensate for the distance between the water surface and the peripheral structures of the pool.

4. The apparatus of claim 3 for use in a pool wherein the peripheral structure is coping and wherein said affixing means comprises a bracket closely shaped to the peripheral coping of a pool.

5. The apparatus of claim 3 wherein said support member is crooked intermediate its ends to extend downwardly to dispose said hoop partially below the water surface.

6. The apparatus of claim 3 wherein said support member is crooked intermediate its ends to extend upwardly to dispose said hoop partially below the water surface.

7. The apparatus of claim 3 wherein said hoop is supported at the distal end of said support member by means for rotating said hoop about a vertical axis.

8. The apparatus of claim 3 wherein said means for affixing said support member to the periphery of the pool includes pivot means for rotational movement of said support member about a horizontal axis.

* * * * *